United States Patent [19]

Shimizu et al.

[11] Patent Number: 5,450,127
[45] Date of Patent: Sep. 12, 1995

[54] IMAGE PICKUP APPARATUS FOR PERFORMING EXPOSURE CONTROL BY USING ONE-DIMENSIONAL IMAGE PICKUP DEVICE

[75] Inventors: Hiroto Shimizu, Komae; Yoshimasa Yokoyama, Hachioji, both of Japan

[73] Assignee: Casio Computer Co., Ltd., Tokyo, Japan

[21] Appl. No.: 361,178

[22] Filed: Dec. 21, 1994

Related U.S. Application Data

[63] Continuation of Ser. No. 102,427, Aug. 5, 1993, abandoned.

[30] Foreign Application Priority Data

Oct. 15, 1992 [JP] Japan .................. 4-302843
Oct. 30, 1992 [JP] Japan .................. 4-316090

[51] Int. Cl.⁶ ............................................ H04N 5/335
[52] U.S. Cl. .................................. 348/205; 358/497
[58] Field of Search ............... 348/205; 358/475, 446, 358/509, 497, 296, 494, 479; 250/208.1, 208.3; H04N 5/335

[56] References Cited

U.S. PATENT DOCUMENTS

| | | | |
|---|---|---|---|
| 4,074,324 | 2/1978 | Barrett | 358/296 |
| 4,329,717 | 5/1982 | Logie et al. | 382/63 |
| 4,687,318 | 8/1987 | Shibasaki et al. | 355/5 |
| 4,733,271 | 3/1988 | Arai | 355/5 |
| 4,980,776 | 12/1990 | Aosaki et al. | 358/494 |
| 4,990,947 | 2/1991 | Komiya et al. | 348/345 |
| 5,040,072 | 8/1991 | Tsuji et al. | 358/228 |
| 5,051,833 | 9/1991 | Tsuji | 358/227 |
| 5,067,028 | 11/1991 | Ogura et al. | 358/494 |

*Primary Examiner*—Donald J. Yusko
*Assistant Examiner*—Michael Day
*Attorney, Agent, or Firm*—Frishauf, Holtz, Goodman, Langer & Chick

[57] ABSTRACT

An image pickup apparatus includes an optical system for forming an image of an object. An image pickup section effects the image pickup operation by causing a one-dimensional image pickup device to scan an image formed by the optical system. A light exposure detecting section detects light exposure based on a luminance signal output according to the scanning operation of the one-dimensional image pickup device at the light exposure detection time. A control section controls the image pickup section according to the light exposure detected by the light exposure detecting section at the time of image pickup operation.

2 Claims, 6 Drawing Sheets

IMAGE PICKUP APPARATUS FOR PERFORMING EXPOSURE CONTROL BY USING ONE-DIMENSIONAL IMAGE PICKUP DEVICE

This application is a continuation, of application Ser. No. 08/102,427, filed Aug. 5, 1993, now abandoned.

BACKGROUND OF THE INVENTION

1. Field of the Invention

This invention relates to an image pickup apparatus for taking a picture of an image of an object such as a blackboard.

2. Description of the Related Art

When an explanation is given by use of the blackboard in a conference, it is sometimes required to easily record the contents written on the blackboard.

For this purpose, conventionally, a blackboard having a copying function, i.e., a so-called electronic blackboard is proposed. The technology of the electronic blackboard is disclosed in U.S. Pat. No. 4,687,318 and U.S. Pat. No. 4,733,271, for example.

However, since the electronic blackboard itself has the copying function, the size of the blackboard becomes large, making it difficult to be moved from one conference room to another.

Therefore, there is developed an image pickup apparatus which optically reduces the size of the image of an object such as a blackboard and takes the image of the object. More specifically, the image pickup apparatus derives an image signal by scanning the reduced image of the blackboard with a one-dimensional image pickup device, and prints the image signal on recording paper. Since the image pickup apparatus is a device different from the blackboard, the image pickup apparatus can be easily moved from one conference room to another. The technology of the image pickup apparatus is disclosed in U.S. Pat. No. 4,074,324 or U.S. Pat. No. 5,067,028, for example.

The exposure control for the above image pickup apparatus is effected by detecting the light exposure of an object image formed by a lens by use of a light receiving element different from the image pickup device and controlling the diaphragm mechanism according to the detected light exposure. In some cases where a two-dimensional image pickup device is used as the image pickup device, the diaphragm mechanism is controlled according to the light amount detected by the two-dimensional image pickup device.

However, the light amount is irregular on the imaging plane of the lens, and the effect of this irregularity cannot be eliminated. As a result, adequate light exposure control cannot be made if the light exposure in an area larger than a preset area on the imaging plane is not detected in a case where the image pickup device is used.

Of course, in the image pickup apparatus using the two-dimensional image pickup device for image pickup, the light amount on the entire imaging plane can be detected by use of the two-dimensional image pickup device so that no problem will occur even if the light exposure control is performed using the image pickup device. However, in the image pickup apparatus using a one-dimensional image pickup device, the light amount can be detected only in a one-dimensional fashion and the light amount of more than a preset area cannot be detected even if the one-dimensional image pickup device is used in the same manner as in the case of the two-dimensional image pickup device to effect the light exposure control.

Therefore, in the image pickup apparatus using the one-dimensional image pickup device, it is difficult to control the light exposure by using only the one-dimensional image pickup device. It then becomes necessary to additionally use a light exposure sensor for detecting the light exposure in order to adequately perform exposure control.

SUMMARY OF THE INVENTION

This invention has been made to solve the above problem, and an object of this invention is to provide an image pickup apparatus in which the one-dimensional image pickup device scans an image formed by an optical system, and a light exposure detecting means detects the light exposure according to the scanning result of the one-dimensional image pickup device at the time of light exposure detection. After the light exposure is detected, the light exposure is first controlled by the light exposure detecting means at the image pickup time and the image pickup is then performed by the scanning operation of the one-dimensional image pickup device.

That is, an image pickup apparatus comprises an optical system for forming an image of an object; an image pickup means for taking a picture of an image formed by the optical system by the scanning operation of a one-dimensional image pickup device; a light exposure detecting means for detecting light exposure based on a luminance signal output according to the scanning operation of the one-dimensional image pickup device at the light exposure detection time; and a control means for controlling exposure time of the image pickup means according to the light exposure detected by the light exposure detecting means at the image pickup time.

With the above construction, light exposure is detected based on the scanning result of the one-dimensional image pickup device at the light exposure detection time and the exposure time control operation of the one-dimensional image pickup is effected based on the detected light exposure at the time of image pickup for the image pickup operation. Thus, in the image pickup apparatus using a one-dimensional image pickup device, the image pickup operation can be effected in the optimum light exposure state by detecting from the imaging plane, the light exposure necessary for adequate light exposure control without additionally using a light exposure sensor.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENT

There will now be described an embodiment of this invention with reference to the accompanying drawings.

Figure 1:
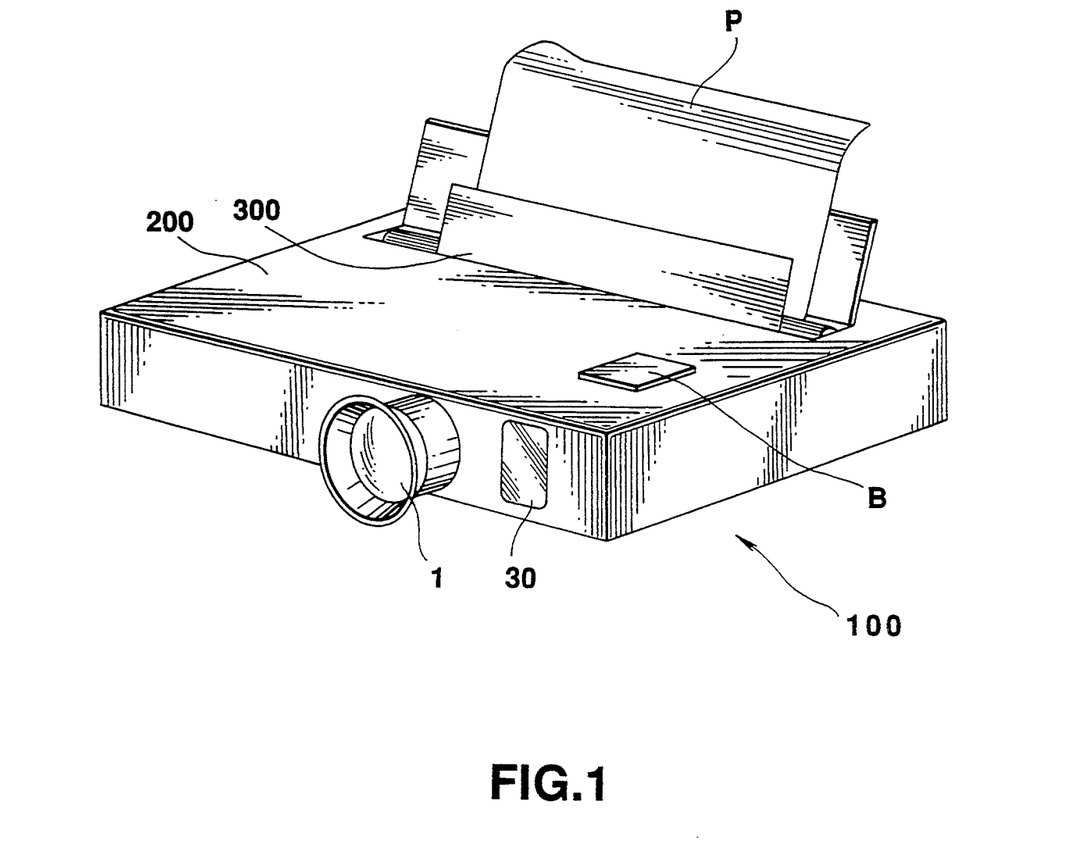
FIG. 1 is an external view of an image pickup apparatus according to one embodiment of this invention.

FIG. 1 is an external view of an image pickup apparatus according to one embodiment of this invention. The image pickup apparatus 100 has a main body case 200, a lens 1, a distance measuring infrared sensor 30 using a filter, an image pickup operation starting button B for starting the image pickup operation, and a printing section 300 for printing a pickup image on thermal paper P which are mounted on the main body case 200.

Figure 2:
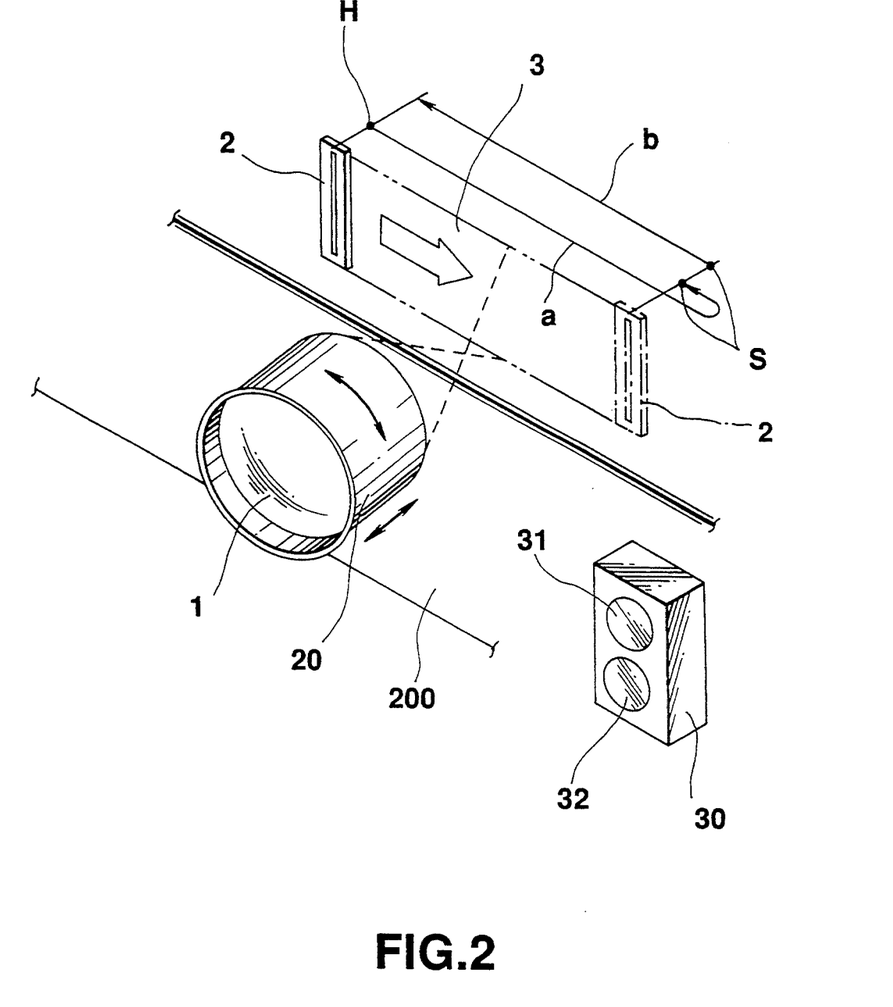
FIG. 2 is a view showing the schematic construction of an image pickup section of the image pickup apparatus.

A picture of an object image formed by the lens 1 is taken and then the object image is directly transferred onto the thermal paper P by means of the printing section 300. As shown in FIG. 2, the structure of the image pickup section is such that a line charge coupled device (CCD) 2 having elements arranged in a vertical direction to read an image for each line in the vertical direction is disposed behind the lens 1 to freely move in a horizontal direction.

That is, the image pickup lens 1 is disposed in a tubular lens housing 20 which is mounted to be movable in the optical axial direction on the case 200 of the image pickup apparatus. For optimal focusing, the lens 1 is driven in the optical axis direction together with the lens housing 20 by driving a lens moving motor (stepping motor) 17 which will be described later.

The line CCD 2 having elements arranged in a vertical direction to read an image for each line in the vertical direction is disposed behind the lens 1 in the case 200 to freely move in a horizontal direction. The line CCD 2 is movable on a forward path a, starting from a home position H set on one side of an imaging plane 3 of the lens 1, and on a return path b, having an image pickup starting position S set on the other side of the imaging plane 3.

Figure 4:
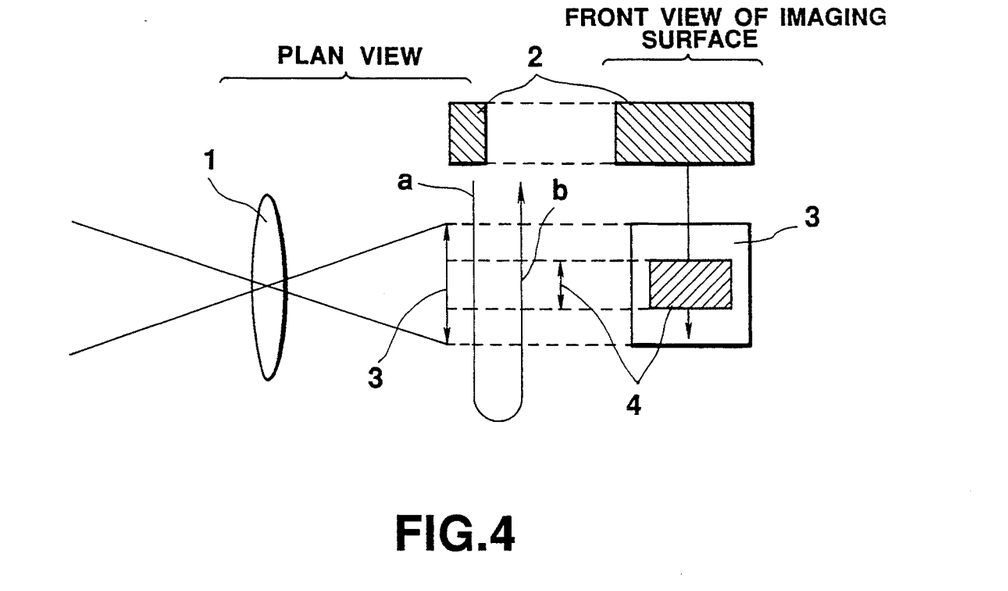
FIG. 4 is a diagram for illustrating the light exposure operation of the image pickup apparatus.

As shown in FIG. 4, the central portion of the imaging plane 3 sets a light exposure detection area 4 on the forward path a, and detects the light exposure in the light exposure detection area 4. An image on the entire portion of the imaging plane 3 is read by moving the line CCD 2 from the pickup operation starting position S to the home position H along the return path b. The forward path a and return path b form a continuous path.

Further, the distance measuring sensor 30 is disposed to the side of the lens 1 inside the case 200. The distance measuring sensor 30 is an infrared trigonometrical distance measuring system including a light emitting element 31 for emitting infrared light and a light receiving element 32. The distance to an object is detected based on the spot position obtained when infrared light emitted from the light emitting element 31 is reflected from the object and received by the light receiving element 32.

Figure 3:
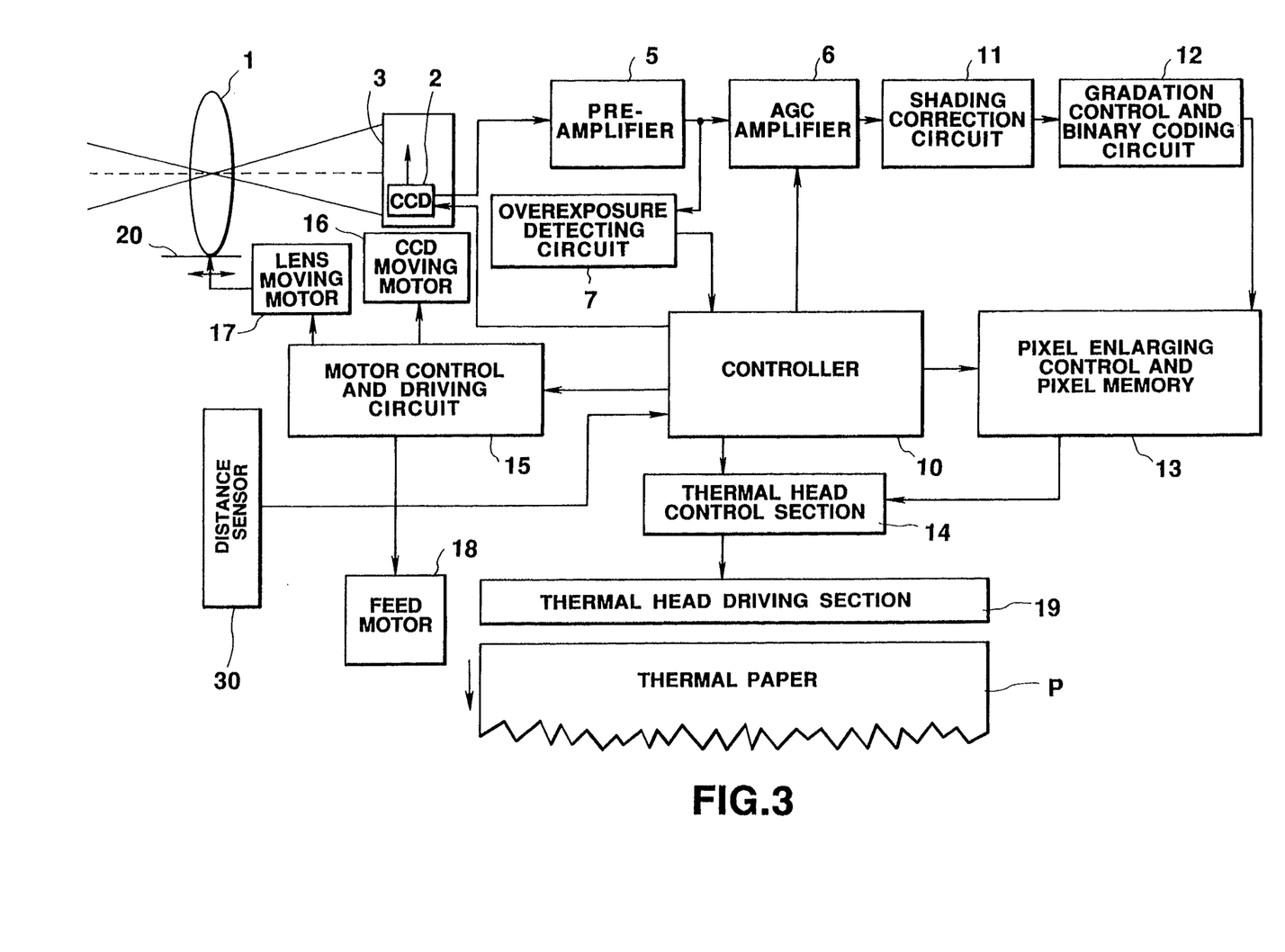
FIG. 3 is a block diagram of the image pickup apparatus.

FIG. 3 is a block diagram showing the entire structure of an image pickup apparatus according to this embodiment. That is, an image of an object is formed on the imaging plane 3 by the lens 1, and a picture of the object image is taken by moving the line CCD 2 in a horizontal direction.

Figure 5:
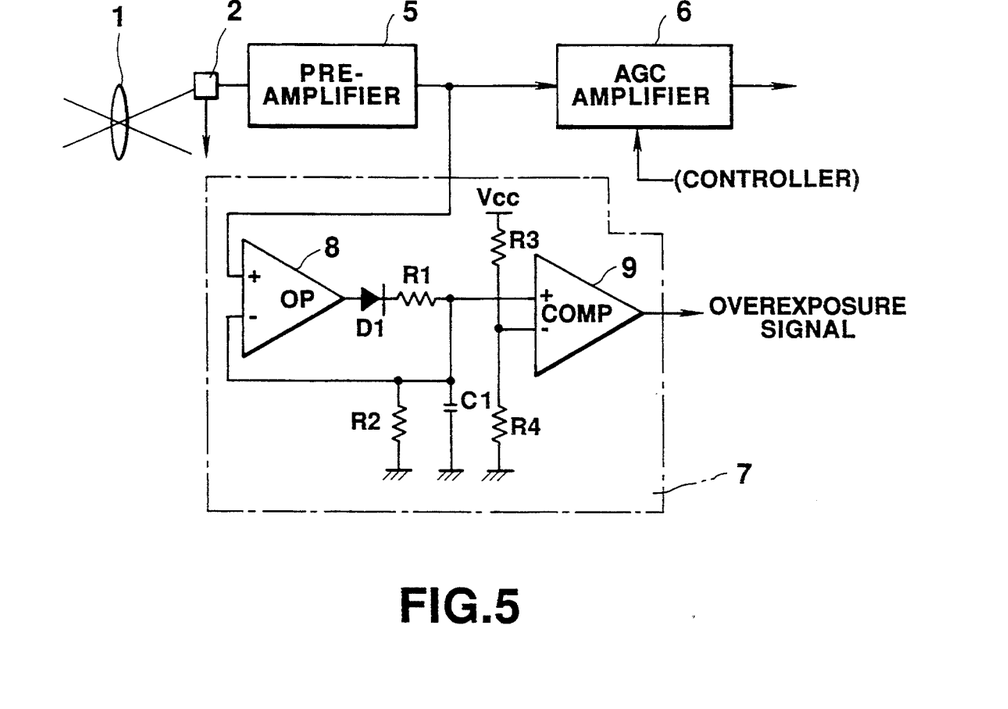
FIG. 5 is a circuit diagram showing the detail of an overexposure detecting circuit of the image pickup apparatus.

An image signal sequentially output from the line CCD 2 when it is moved is amplified by a pre-amplifier 5 and input to an overexposure detecting circuit 7. The overexposure detecting circuit 7 has a construction as shown in FIG. 5.

An image signal amplified by the pre-amplifier 5 is supplied to the non-inverting input terminal of a peak detection operational (OP) amplifier 8. The output terminal of the peak detection OP amplifier 8 is connected to the non-inverting input terminal of a comparator 9 via a diode $D_1$ and a resistor $R_1$, and the inverting input terminal of the comparator 9 is connected to $V_{cc}$ via a resistor $R_3$ and grounded via a resistor $R_4$. Further, the inverting terminal of the peak detection OP amplifier 8 is grounded via a resistor $R_2$ and a capacitor $C_1$. The capacitor $C_1$ is connected to a node between the resistor $R_1$ and the non-inverting terminal of the comparator 9.

In summary, the peak value of an image signal (luminance signal) is held by a peak value detection circuit constructed by the peak detection OP amplifier 8, diode $D_1$, resistors $R_1$, $R_2$ and capacitor $C_1$. The approximate values of response time $t_A$ and hold time $t_H$ in the peak detection circuit are derived as follows:

$$t_A = R_1 \times C_1$$

$$t_H = R_2 \times C_1$$

The result of extraction of the image signal level in the light exposure detection area 4 shown in FIG. 4 can be output to the comparator 9 without reacting to instantaneous rise in the luminance. This is achieved by adequately setting the values of the resistors $R_1$, $R_2$ and capacitor $C_1$ such that the response time $t_A$ and hold time $t_H$ correspond to a time for the signal to be transmitted from the line CCD 2.

In the comparator 9, an image signal level input to the non-inverting terminal thereof and a reference level, as will be described below, are compared with each other. If the image signal level exceeds the reference level, an overexposure signal of "1" is supplied to a controller 10, and if the image signal level is equal to or less than the reference level, a signal of "0" is supplied to a controller 10. The aforementioned reference level is given by $V_{cc} \times R_3/(R_3+R_4)$.

On the other hand, an image signal sequentially output from the line CCD 2 in response to the movement on the return path b is amplified by the pre-amplifier 5, and the gain is adjusted to be constant by an AGC amplifier 6. Thus, the contour emphasizing and correcting process is effected. After the brightness of the central and peripheral portions of an image is corrected by a shading correction circuit 11, the image signal, which was output from the AGC amplifier 6, is subjected to the gradation control and binary coding process by a gradation control and binary coding circuit 12. The binary-coded image signal is then input to a pixel enlarging control and pixel memory 13.

The controller 10 controls the line CCD 2, the AGC amplifier 6, the gradation control and binary-coding circuit 12, and the pixel enlarging control and pixel memory 13. In addition, the controller 10 also controls a thermal head control section 14 and a motor control and driving circuit 15. The motor control and driving circuit 15 in turn controls a CCD moving motor 16 for driving the line CCD 2 in the horizontal direction, a lens moving motor 17 for driving the lens 1 in the optical axis direction for precise focusing, and a feed motor 18 for driving feed rollers (not shown) for feeding the thermal paper P.

Further, the controller 10 is supplied with a signal indicating a distance from the distance measuring sensor 30 to the object. The controller 10 then controls the motor control and driving circuit 15 according to this distance indicating signal to drive the lens moving motor 17 and the lens housing 20 so as to precisely set the focusing position of the lens 1.

Although not shown in the drawing, the controller 10 is supplied with an image pickup operation starting signal which is generated by operating the image pickup operation starting button B.

The thermal head control section 14 controls a thermal head driving section 19 according to a position control signal output from the controller 10 and a serial image signal output from the pixel enlarging control and pixel memory 13. The thermal head driving section 19 is operated according to an input signal, or the like, to thermally transfer an image of one image frame which is obtained when the line CCD 2 is driven by once in the horizontal direction onto the thermal paper P.

Figure 7:
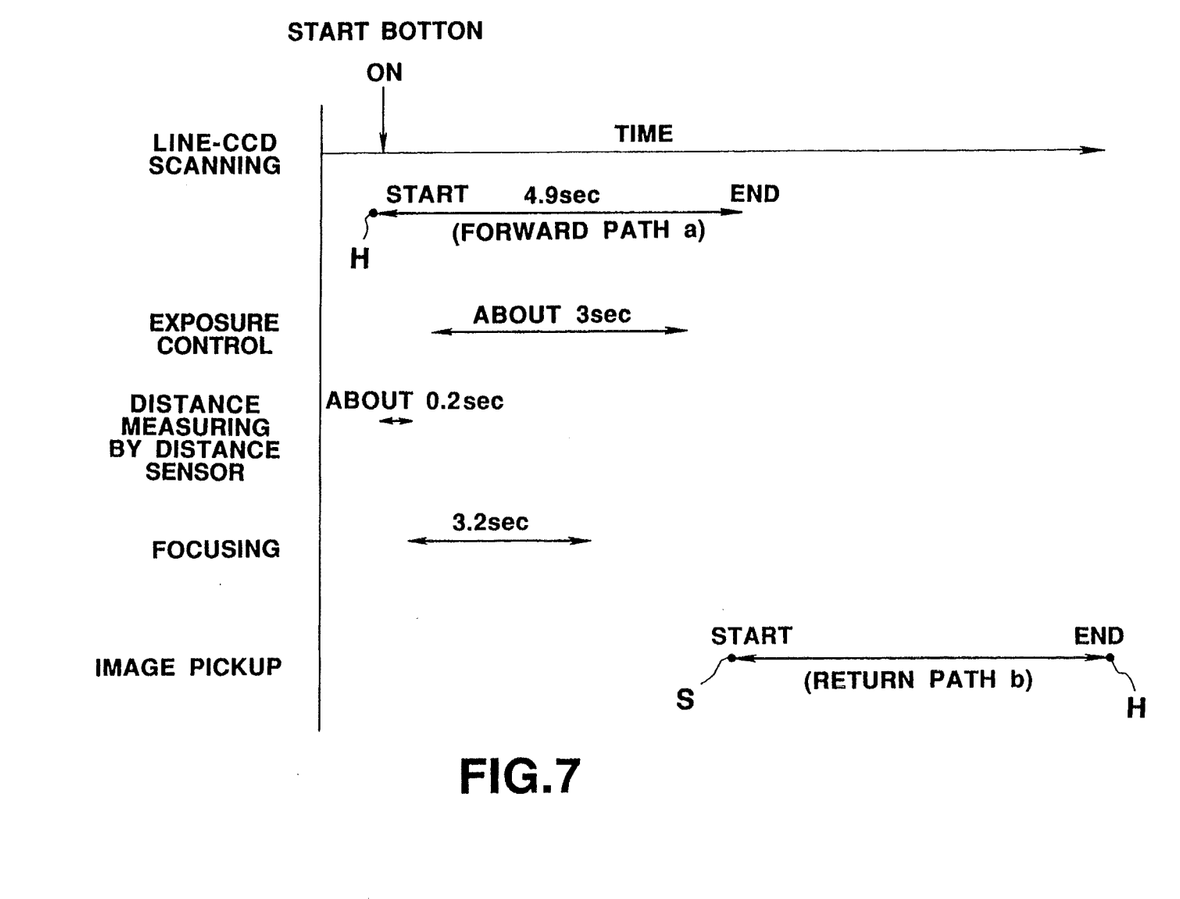
FIG. 7 is a timing chart showing the image pickup operation of the image pickup apparatus.

Henceforth, the operation of this embodiment with the above construction is explained in detail with reference to the timing chart of FIG. 7. When a picture of an image of an object such as a blackboard is taken, the image pickup operation starting button B is operated to set up a state in which an image of the object can be formed on the imaging plane 3.

Then, the line CCD 2 is driven in response to a command from the controller 10, and the motor control and driving circuit 15 is operated to drive the CCD moving motor 17. As a result, the CCD moving motor 17 is rotated in a preset direction to move the line CCD 2 from the home position H in the horizontal direction along the imaging plane 3 of the lens 1 on the forward path a.

The distance measuring sensor 30 starts the measurement of distance to the object in response to the ON operation of the image pickup operation starting button and completes the distance measurement in approx. 0.2 sec. Then, the controller 10 operates the motor control and driving circuit 15 to drive the lens moving motor 17, which starts the focusing operation of the lens 1 at the same time as the completion of the distance measurement. The time for attaining the precise focusing is, at least approx. 3.2 sec which is when the distance to the object is shortest (70 cm) from the image pickup apparatus.

The exposure adjustment operation ms started slightly after the distance measurement by the distance measurement sensor 30 is completed. The exposure adjustment operation is effected according to the flow-chart shown in FIG. 6, and execution time of this operation is approx. 3 sec. Further, since the exposure adjustment operation occurs in parallel with the focusing operation of the lens 1 (3.2 sec.), the exposure adjustment operation and the focusing operation are completed before the movement of the line CCD 2 on the forward path a is completed (4.9 sec.). The exposure adjustment operation is effected when the line CCD 2 is moved on the forward path a and an image signal output from the line CCD 2 is input to the overexposure detection circuit 4 via the pre-amplifier 5. At this time, the AGC amplifier 6 is set in the non-operative state by the control signal from the controller 10, and therefore, an image signal is not input to the AGC amplifier 6 while the line CCD 2 is effecting the scanning operation on the forward path a.

In the overexposure detection circuit 4, the level of the image signal in the exposure detection area 4 is compared with the reference level by the comparator 9. The result of this comparison is input to the controller 10. The controller 10 is operated according to the subroutine shown in FIG. 6 which is executed by interrupting the main routine (not shown), and involves reading out an overexposure detection signal output from the comparator 9 of the overexposure detection circuit 4 (step S1). Then, the readout overexposure signal is determined as "1" or "0" (step S2). If the overexposure signal is "0" and the image signal level is not higher than the reference level, the process of the sub-routine is completed and the process of the main routine is effected without reducing the CCD exposure time.

Figure 6:
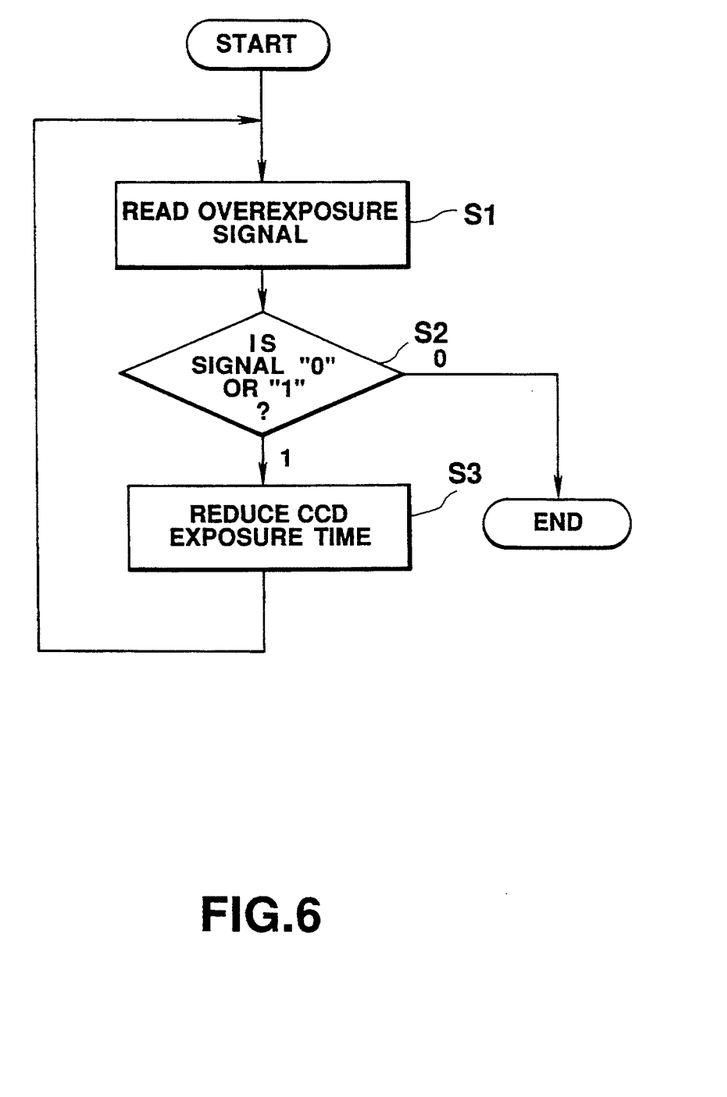
FIG. 6 is a flowchart for illustrating the procedure of determining the exposure time in the above embodiment.

On the other hand, if the overexposure signal is "1" and the image signal level is higher than the reference level, the CCD exposure time is reduced (step S3). Hence, the step S1 is performed again to read out an overexposure signal which is compared with the reference level (step S2). If the image signal level is still higher than the reference level after the CCD exposure time is initially reduced, the loop from step S1 to step S3 is reiterated, resulting in the reduction of the CCD exposure time with each iteration. When the image signal level becomes equal to or lower than the reference level, the process is ended after the step S2 is effected, and thus the process of the sub-routine is completed.

Therefore, when the process of the sub-routine is completed, the CCD exposure time is determined such that the level of the image signal from the line CCD 2 may be set to an adequate value which is equal to or lower than the reference level and can be approximately equal to the reference level.

when the movement of the line CCD 2 on the forward path a is completed, the motor control and driving circuit 15 rotates the CCD moving motor 16 in an opposite direction to that of movement on the forward path a, so that the line CCD 2 can be moved on the return path b along the imaging plane 3 of the lens 1. At this time, the exposure time of the line CCD 2 is set to an adequate value in the process of movement on the forward path a so that an image signal of adequate light exposure, free from underexposure or overexposure, can be output from the line CCD 2.

Therefore, when the line CCD 2 starts to move on the return path b from the image pickup operation starting position S, a state in which adequate exposure and precise focusing are set can be set up. When the line CCD 2 reaches the home position H after the image pickup operation is started in the state in which adequate exposure and precise focusing are set, the image pickup operation of one image frame is completed.

In summary, an image signal of adequate light exposure output from the line CCD 2 is amplified by the preamplifier 5, and then input to the AGC amplifier 6 which is set into the operative state by the controller 10. After the image signal input to the AGC amplifier 6 is controlled to have a constant gain and subjected to the contour emphasizing and correcting process, the brightness of the central portion of the image and the peripheral portion thereof is subjected to the correcting process by the shading correction circuit 11. The image signal is then subjected to the gradation control and binary coding process by the gradation control and binary coding circuit 12, and transferred to the pixel enlargement control and pixel memory 13.

Further, the thermal head control section 14 controls the thermal head driving section 19 according to a position control signal output from the controller 10 or a serial image signal output from the pixel enlargement control and pixel memory 13.

More specifically, the thermal head driving section 19 is operated according to an input signal or the like, so that an image of one image frame obtained when the line CCD 2 is moved on the return path b can be thermally transferred onto the thermal paper P which is being fed.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An image pickup apparatus comprising:
   an optical system for directing an image of an object to an imaging plane;
   image pickup means, having a one-dimensional image pickup device arranged at the imaging plane so as to extend in a first direction, for picking up the image of the object directed by said optical system to the imaging plane;
   scanning means for reciprocally scanning the imaging plane along a forward path and a reverse path in a second direction which is perpendicular to the first direction, thereby reciprocally moving said image pickup means in the second direction;
   focused state setting means, having a distance measuring sensor for measuring a distance to the object, for setting said optical system in a focused stated in accordance with a signal indicating the distance measured by said distance measuring sensor when said image pickup means is scanned by said scanning means along the forward path;
   detection means for detecting light exposure amounts of the one-dimensional image pickup device in said image pickup means in accordance with an electric signal output from the one-dimensional image pickup device when said image pickup means is scanned by said scanning means along the forward path;
   light exposure time adjusting means for adjusting a light exposure time of the one-dimensional image pickup device in accordance with the light exposure amounts detected by said detection means; and
   output means for outputting an image pickup signal of the object in accordance with the electric signal output from the one-dimensional image pickup device whose light exposure time has been adjusted by said light exposure time adjusting means, when said image pickup means is scanned by said scanning means along the reverse path.

2. An image pickup method comprising the steps of:
   directing an image of an object to an imaging plane by using an optical system;
   picking up the image of the object directed by said optical system to the imaging plane, by using image pickup means having a one-dimensional image pickup device arranged at the imaging plane so as to extend in a first direction;
   reciprocally scanning the imaging plane along a forward path and a reverse path in a second direction which is perpendicular to the first direction, thereby reciprocally moving said image pickup means in the second direction;
   setting said optical system in a focused state in accordance with a signal indicating a distance to the object when said image pickup means is scanned along the forward path;
   detecting light exposure amounts of the one-dimensional image pickup device in said image pickup means in accordance with an electric signal output from the one-dimensional image pickup device when said image pickup means is scanned along the forward path;
   adjusting a light exposure time of the one dimensional image pickup device in accordance with the detected light exposure amounts; and
   outputting an image pickup signal of the object in accordance with the electric signal output from the one-dimensional image pickup device whose light exposure time has been adjusted, when said image pickup means is scanned along the reverse path.

* * * * *